(12) United States Patent
Frampton et al.

(10) Patent No.: US 9,279,392 B2
(45) Date of Patent: Mar. 8, 2016

(54) GASEOUS ENGINE FUEL DELIVERY

(71) Applicant: Kohler Co., Kohler, WI (US)

(72) Inventors: Isaac S. Frampton, Strattanville, PA (US); Robert J. Danforth, III, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 204 days.

(21) Appl. No.: 14/012,214

(22) Filed: Aug. 28, 2013

(65) Prior Publication Data

US 2015/0059696 A1    Mar. 5, 2015

(51) Int. Cl.
*F02M 21/04* (2006.01)
*F02M 35/10* (2006.01)

(52) U.S. Cl.
CPC ....... *F02M 21/047* (2013.01); *F02M 35/10262* (2013.01); *F02M 35/10118* (2013.01)

(58) Field of Classification Search
CPC . F02M 21/04; F02M 21/047; F02M 21/0218; F02M 21/0248; F02M 21/0251; F02M 21/0254; F02M 21/0257; F02M 21/278; F02M 19/08; F02M 35/10118; F02M 35/10262; F02M 43/04; F02M 47/06; F02M 51/06; F02M 51/00; F02M 57/04; F02B 43/00; F02B 43/12
USPC .................................................. 123/403, 527
See application file for complete search history.

(56) References Cited

U.S. PATENT DOCUMENTS

| | | | | |
|---|---|---|---|---|
| 2,073,298 A | * | 3/1937 | Ensign | F02M 59/14 261/DIG. 2 |
| 2,073,299 A | * | 3/1937 | Ensign | F02M 21/047 48/184 |
| 2,683,027 A | * | 7/1954 | Garretson | F02M 21/00 261/16 |
| 2,683,084 A | * | 7/1954 | Garretson | F02M 21/00 48/184 |
| 2,860,616 A | | 11/1958 | Dermond | |
| 2,863,434 A | * | 12/1958 | Holley, Sr. | F02M 7/02 123/533 |
| 2,949,102 A | | 8/1960 | Arkus-Duntov | |
| 2,960,976 A | | 11/1960 | Cassell et al. | |
| 3,667,494 A | | 6/1972 | Haase | |
| 3,868,936 A | | 3/1975 | Rivere | |
| 3,942,494 A | | 3/1976 | Toda et al. | |
| 4,002,151 A | | 1/1977 | Toyoda et al. | |
| 4,183,339 A | | 1/1980 | Nagaishi et al. | |
| 4,223,655 A | | 9/1980 | Arietti et al. | |
| 4,270,500 A | | 6/1981 | Nakagawa et al. | |
| 4,369,749 A | * | 1/1983 | Sugi | F02M 5/10 123/439 |

(Continued)

FOREIGN PATENT DOCUMENTS

GB           548898     10/1942
WO    WO 2006079173     8/2006

*Primary Examiner* — Lindsay Low
*Assistant Examiner* — Grant Moubry
(74) *Attorney, Agent, or Firm* — Lempia Summerfield Katz LLC

(57) ABSTRACT

A fuel delivery system may be utilized in an internal combustion engine or a generator engine. The fuel delivery system includes a fuel injector and a venturi. The venturi provides a force for delivering the fuel into the manifold of the engine, and the fuel injector provides metering to control the amount of fuel delivered into the manifold of the engine. In one example, the fuel delivery system includes a first chamber configured to enclose a gaseous fuel, a second chamber configured to direct a flow of air through the venturi, and a plunger. The plunger is controlled to selectively connect and disconnect the first chamber and the second chamber to control the flow of the gaseous fuel into the second chamber under a differential pressure of the venturi.

20 Claims, 8 Drawing Sheets

(56) References Cited

U.S. PATENT DOCUMENTS

| | | | |
|---|---|---|---|
| 4,574,760 A | 3/1986 | Jones et al. | |
| 5,311,849 A * | 5/1994 | Lambert | F02D 9/10 123/179.15 |
| 5,368,273 A | 11/1994 | Dante | |
| 5,713,340 A | 2/1998 | Vandenberghe et al. | |
| 5,749,346 A | 5/1998 | Halvorson et al. | |
| 5,809,972 A * | 9/1998 | Grant | F02M 71/00 123/472 |
| 6,205,981 B1 | 3/2001 | Lorraine | |
| 6,305,351 B1 | 10/2001 | Neumann et al. | |
| 7,905,469 B2 * | 3/2011 | Nickels | F02M 13/08 123/527 |
| 8,342,158 B2 | 1/2013 | Ulrey et al. | |
| 2008/0290531 A1 * | 11/2008 | Nickels | F02M 13/08 261/52 |
| 2008/0308068 A1 | 12/2008 | Grant | |
| 2012/0296551 A1 | 11/2012 | Kabasin | |

* cited by examiner

GASEOUS ENGINE FUEL DELIVERY

TECHNICAL FIELD

This disclosure relates in general to gaseous engines and generators, or more particularly, to gaseous engines and generators including a fuel injector and a venturi surface.

BACKGROUND

An internal combustion engine converts potential chemical energy in the form of a fuel into mechanical energy. The mechanical energy may be applied to an alternator (or generator) for generating electrical energy, which is stored or delivered as electricity. Various fuels are available for internal combustion engines. Some recent developments have focused on alternatives to gasoline and other conventional fuels as efforts toward cleaner burning engines have gained momentum. Other types of fuels, such as gaseous fuels, provide numerous advantages over conventional fuels. Gaseous fuels may produce less emission. Gaseous fuels may cost less for the consumer. Gaseous fuels also present additional considerations in the design of internal combustion engines to optimize energy efficiency, exhaust production, and versatility. One area in which gaseous fuels have presented opportunities for improvements is the fuel delivery system that supplies fuel to the engine.

BRIEF DESCRIPTION OF THE DRAWINGS

Exemplary implementations are described herein with reference to the following drawings.

DETAILED DESCRIPTION

The following examples describe a fuel delivery system, an internal combustion engine including the fuel delivery system, or a generator engine including the fuel delivery system. The fuel delivery system includes a fuel injector and a venturi surface. The venturi surface may provide a force for delivering the fuel into the manifold of the engine without the need for a pump. The fuel injector may provide metering to control the amount of fuel delivered into the manifold of the engine more accurately than possible with only the venturi surface. The fuel injector and venturi surface combination may be located just before a cylinder, providing a quick reaction time to changes in the throttle or changes in the fuel ratio. In addition, because air upstream of the venturi surface is often less combustible, positioning the fuel injector and venturi surface combination before the cylinder may reduce any chance of pollution or accidental combustion. Thus, a lower cost and more accurate fuel delivery system may be achieved.

Figure 1:
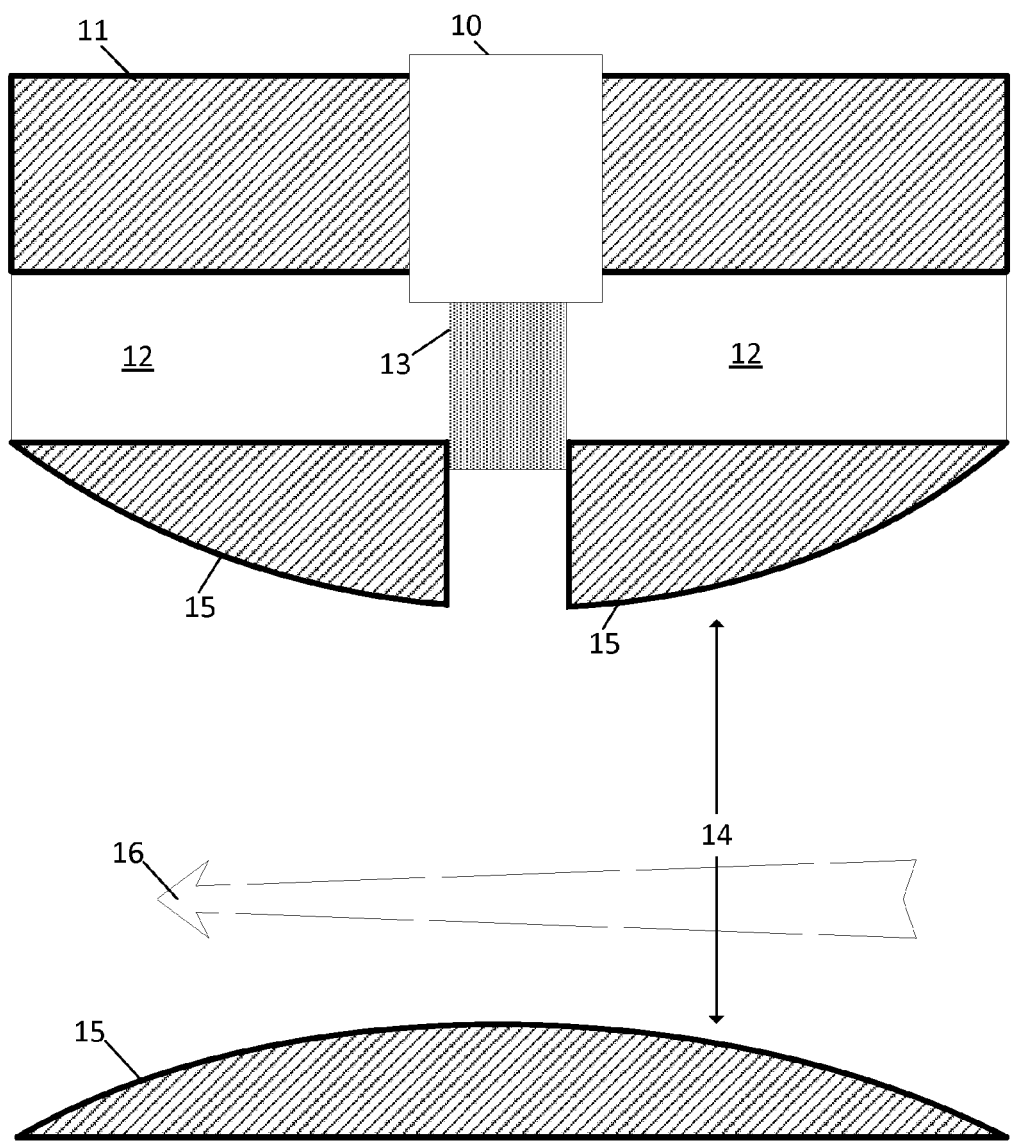
FIG. 1 illustrates an example fuel delivery system.

FIG. 1 illustrates an example fuel delivery system. The fuel delivery system may include a fuel injector 10, a chassis 11, a fuel chamber 12, a plunger 13, a venturi passage 14, and a venturi surface 15. The flow of air through the venturi passage 14 is shown by arrow 16. The fuel injector 10 may be coupled with the chassis 11 and may engage the fuel chamber 12. The plunger 13 may be coupled with and or integrally formed with the fuel injector 10. The venturi surface 15 may be coupled with or integrally formed with the chassis 11. The phrases "coupled with" or "coupled to" include directly connected to or indirectly connected through one or more intermediate components. Additional, different, or fewer components may be provided. For example, in some systems, multiple fuel injectors and plungers may be engaged with the fuel chamber.

The fuel chamber 12 may be a hermetically sealed chamber configured to enclose a gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. The fuel chamber 12 may store the gaseous fuel at a low pressure and receive the gaseous fuel from a gaseous fuel tank that may or may not store the gaseous fuel at a high pressure.

The venturi passage 14 or chamber may direct a flow of air across the venturi surface 15. The venturi passage 14 may include a narrowed section of passage having a smaller cross section than a preceding portion of the passage. The narrowed section causes an increase in the velocity of the flow of air. Through the conservation of energy, the increase in the velocity of the flow of air causes a decrease in pressure in the venturi passage 14. The decrease in pressure or differential pressure creates a force that pulls the gaseous fuel from fuel chamber 12 when the two chambers (the fuel chamber 12 and the venturi passage 14) are connected. Example values for the differential pressure between the venturi passage 14 and the fuel chamber 12 may include 2-10 psi. Example values for the pressure in the venturi passage 14 may range from 5-15 psi and example values for the pressure in the fuel chamber may be 0-3 psi. Various other example values are possible.

In one example, the differential pressure may be proportional to a difference in the difference of the square of the velocity of the flow of air in the preceding portion of the passage and the velocity of the flow of air in the narrowed section of the venturi passage 14. The differential pressure may also or alternatively be proportional to the density of the air. The differential pressure may be applied to the gaseous fuel as a force depending on the size of the opening between the fuel chamber 12 and the venturi passage 14. Equation 1 provides an example relationship for an initial pressure ($p_i$), an initial flow velocity ($v_i$), a final pressure ($p_f$), a final flow velocity ($v_f$), and a density of the air ($\rho$). The pressure drop is proportional to the force (F) applied on the fuel according to a constant k defined by the physical design of the fuel delivery system.

$$F = k(p_i - p_f) = \frac{\rho}{2}(v_f^2 - v_i^2). \qquad \text{Eq. 1}$$

The plunger 13 may be selectively connected to and disconnected from the fuel chamber 12 and the venturi passage 14. The connection or disconnection of the plunger 13 may control the flow of the gaseous fuel into the venturi passage 14 and ultimately to the combustion chamber of the engine, which may be downstream of the venturi passage 14 with respect to the flow of the air (or the air and fuel mixture).

Upstream of the venturi passage 14 with respect to the flow of the air (or the air and fuel mixture) may be a throttle. The throttle may control the flow of air into the venturi passage 14. The plunger 13 as shown in FIG. 1 is in an engaged state that disconnects the fuel chamber 12 from the venturi passage 14. The plunger 13 may additionally move to or be positioned in a disengaged state that connects the fuel chamber 12 and the venturi passage 14. Because the injection point of the fuel may be downstream of the throttle and closer to the combustion chamber of the cylinder, the flow of fuel can be controlled with a quicker response time. The quicker response time also provides a quicker start time for the engine. In other words, the air and fuel mixture is only downstream of the venturi passage 14, which is near the combustion chamber. Thus, the flow of air that is upstream of the venturi passage 14 includes no gaseous fuel, or to the extent some gaseous fuel is present upstream of the venturi passage 14, the fuel level in the air is below a minimum level. The minimum level may be a level low enough to prevent combustion of the gaseous fuel. Alternatively, the minimum level may be low enough to prevent detection. Other example minimum levels are possible.

Other forces may be present on the gaseous fuel from the chamber 12. For example, the force of gravity may tend to cause the gaseous fuel from the fuel chamber to enter the venturi passage 14. In addition, a force from the pressure inside the fuel chamber 12 may tend to cause the gaseous fuel from the fuel chamber to enter the venturi passage 14. Other forces may be applied directly from the fuel injector 10. However, in one example, a substantial portion of the force is attributed from the venturi surface 15. A substantial portion may be defined as enough force to cause a statistically significant increase in the flow of gaseous fuel into the venturi passage 14. In another example, a majority portion of the force is attributed from the venturi surface 15. A majority portion is defined as more than half of the total force. In another example, all of the force applied to the gaseous fuel is attributed to the venturi surface.

In an example not illustrated, the gaseous fuel may flow through the fuel injector 10 such that the fuel injector nozzle is the injection point for the gaseous fuel. In this example, the fuel injector 10 may include a pintle nozzle including a tapered pintle, a disk nozzle having a flat disk with holes that are arranged to define the size of the spray of the fuel injector, or a ball and socket nozzle. Internally, the fuel injector 10 may include a seal (e.g., O-ring) between the fuel injector and a fuel rail, a filter to prevent debris from clogging the fuel injector, and a coil winding to apply a magnetic field to the plunger 13 to move the plunger 13. When the gaseous fuel flows through the fuel injector 10, the venturi surface 15 provides the driving force for the flow of gaseous fuel.

Figure 2:
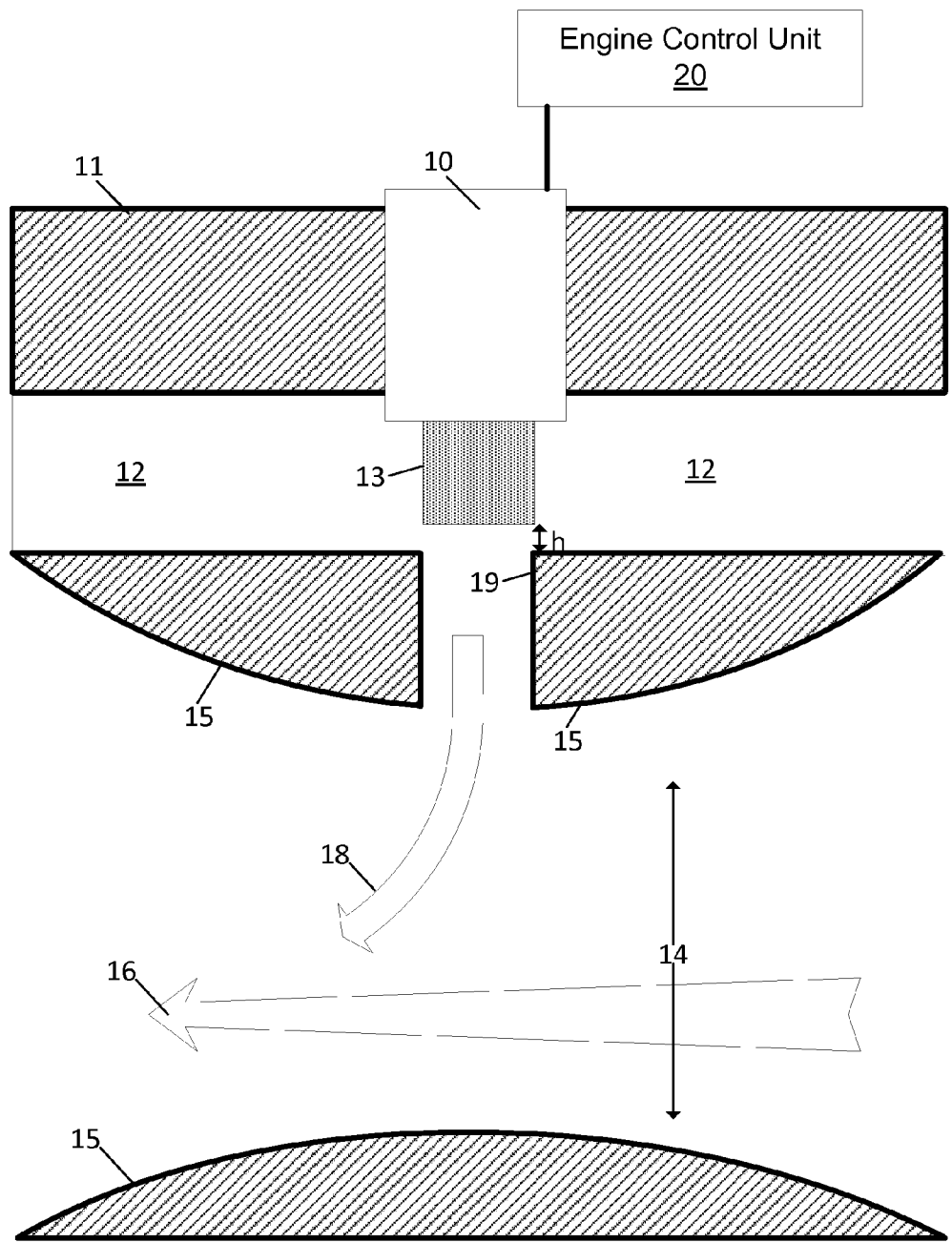
FIG. 2 illustrates another example fuel delivery system.

As an alternative, the fuel injector 10 may be replaced with another type of solenoid. The solenoid may include a rod to selectively connect and disconnect the fuel chamber 12 and the venturi passage 14 without fuel flowing through the solenoid. The plunger 13 may be partially exposed outside of the casing of the fuel injector 10 even when disengaged, as shown in FIG. 2. Alternatively, the plunger 13 may be contained within the fuel injector 10 when in the disengaged state. The plunger 13 may be rectangular or a rectangular prism as shown in FIGS. 1 and 2, or the plunger 13 may be tapered in a conical or pyramidal shape. The solenoid or the fuel injector 10 may include a spring to bias the plunger 13 in a closed position and a coil that, when energized with an electrical current, moves the plunger 13. In other examples, the spring or coil may bias the plunger 13 in an open position.

The fuel delivery system may be part of, or used in or with, an engine or engine-generator. Various other systems may be included in the engine or the engine-generator, which include but are not limited to a cooling system, a lubrication system, an exhaust system, and an electrical system. For example, the fuel injector 10 may be powered by an electrical power source (e.g., a battery, a battery charging alternator). The engine-generator may include an alternator for converting the mechanical energy produced by the engine to an alternating current.

FIG. 2 illustrates another example fuel delivery system. The description of some components of FIG. 2 that are similar to components of FIG. 1 may be applied to the components of FIG. 2. The plunger 13 as shown in FIG. 2 is in a disengaged state that connects the fuel chamber 12 and the venturi passage 14. The disengaged state permits the flow 18 of the gaseous fuel into the venturi passage 14 and the combustion chamber of the engine downstream of the venturi passage 14.

The engine control unit 20, which may be any type of controller, may control the operation of the fuel injector 10. The engine control unit 20 may include at least a memory, a communication interface, and a processor. The engine control unit 20 may generate a drive signal for the fuel injector 10.

In one example, the operation of the fuel injector 10 and plunger 13 may be digital. The fuel injector 10 may be either on or off. In this example, the drive signal may be a square wave. A high level (e.g., 5 volts, 12 volts, or 24 volts) of the square wave may correspond to the disengaged state of the plunger 13 to open the flow of the gaseous fuel into the venturi passage 14. A low level (e.g., −5 volts, −12 volts, or 0 volts) of the square wave may correspond to the engaged state of the plunger 13 to close the flow of gaseous flow.

In another example, the operation of the fuel injector 10 and plunger 13 may be variable. That is multiple positions of the plunger 13 between the engaged state and the disengaged state. The plunger 13 may be separate from a passage 19 by distance h. In some systems, the distance h may vary between 0 and the width of the fuel chamber 12 at the position of the plunger 13. The drive signal may be proportional to the desired vale for the distance h. Example maximum values for the distance include 1 millimeter, 5 millimeters, 1 centimeter or another value. Example voltage ranges that correspond to the variable distance include −12 volts to 12 volts and 0 to 5 volts. The drive signal may be digital and include a pulse train, a bit stream or discrete values. The digital signal may include data specifying the desired distance h.

The engine control unit may be configured to generate the drive signal according to a pressure in the manifold. The pressure may be measured in the venturi passage 14 or upstream of the venturi passage 14. The pressure may be measured by a manifold pressure sensor. As the pressure sensor indicates an increase in pressure, more air arrives at the venturi passage 14, and more gaseous fuel is released by the fuel injector 10. Conversely, as the pressure sensor indicates a decrease in pressure, less air arrives at the venturi passage 14, and less gaseous fuel is released by the fuel injector 10.

In addition or in the alternative, the engine control unit 20 may be configured to generate the drive signal according to an air to fuel ratio. The air to fuel ratio may be a mass ratio. The air to fuel ratio may be selected so that exactly, or substantially exactly, enough fuel is provided to completely burn the amount of air that is provided, or vice versa.

For example, the engine control unit 20 may select the air to fuel ratio using stoichiometry and the chemical makeup of the gaseous fuels. The memory of the engine control unit 20 may include a lookup table of gaseous fuels associated with ideal air to fuel ratios. Example fuel ratios (mass of air:mass of fuel) may include 10, 12, 14, 16, 20 and 30. The lookup table may include a low air to fuel ratio (rich mixture), a medium air to fuel ratio, and a high air to fuel ratio (lean mixture). In one example, the low air to fuel ratio is associated with natural gas, the medium air to fuel ratio is associated with propane, and a high air to fuel ratio is associated with hydrogen. The rich and lean distinction may also be with respect to the theoretical, stoichiometric or chemically ideal amount needed for combustion with a given amount of air. In addition or in the alternative to mass, the air to fuel ratio may be a volumetric ratio of the volume of air to the volume of fuel.

Alternatively, the engine control unit 20 may calculate the desired air to fuel ratio. The air to fuel ratio may be calculated and/or adjusted based one or more of the type of gaseous fuel, temperatures (such as ambient temperature or engine temperature), and/or pressure outside of the engine. During operation of the engine, the air to fuel ratio may be changed as a function of the pressure in the manifold of the engine as determined from an input signal, which is discussed in more detail below. Other variations are possible.

The engine control unit 20 may include a feedback loop to control the air to fuel ratio. The engine control unit 20 may be coupled to an air to fuel ratio (AFR) sensor or another type of oxygen sensor. The AFR sensor may generate an output voltage based on detected oxygen levels. The AFR sensor may be mounted in a specialized monitoring chamber, an exhaust passage, or in the intake passage. The AFR sensor may include a voltage generation material, such as titanium, zirconium, or another material. The voltage generation material may generate a voltage in response to oxygen levels present at the sensor or change resistance as a function of oxygen levels present at the sensor. Alternatively, a mass air flow sensor may be used.

The engine control unit 20 may be configured to receive the output voltage from the AFR sensor and compare the output voltage or the air to fuel ratio associated with the output voltage to a threshold value. When the air to fuel ratio exceeds the threshold, the air to fuel mixture may be too lean. Accordingly, the engine control unit 20 may disengage the plunger 13 or increase the duty cycle for the plunger 13 in order to release some or more of the gaseous fuel from the fuel chamber 12 under a force from low pressure in the venturi passage 14. When the air to fuel ratio is less than the threshold, the air to fuel mixture is too rich. Accordingly, the engine control unit 20 may engage the plunger 13 or decrease the duty cycle for the plunger to reduce, limit, or stop the flow of gaseous fuel into the venturi passage. The threshold may be a function of one or more of the type of gaseous fuel, ambient conditions, and a user configuration.

The engine control unit 20 may also control other functions of the gaseous engine. The engine control unit 20 may generate an ignition control signal for timing the electric spark for initiating combustion in the combustion chamber of one or more cylinders. The engine control unit 20 may generate control signals for idle speed control, emission control, coolant control, valve control or other functions.

Figure 3:
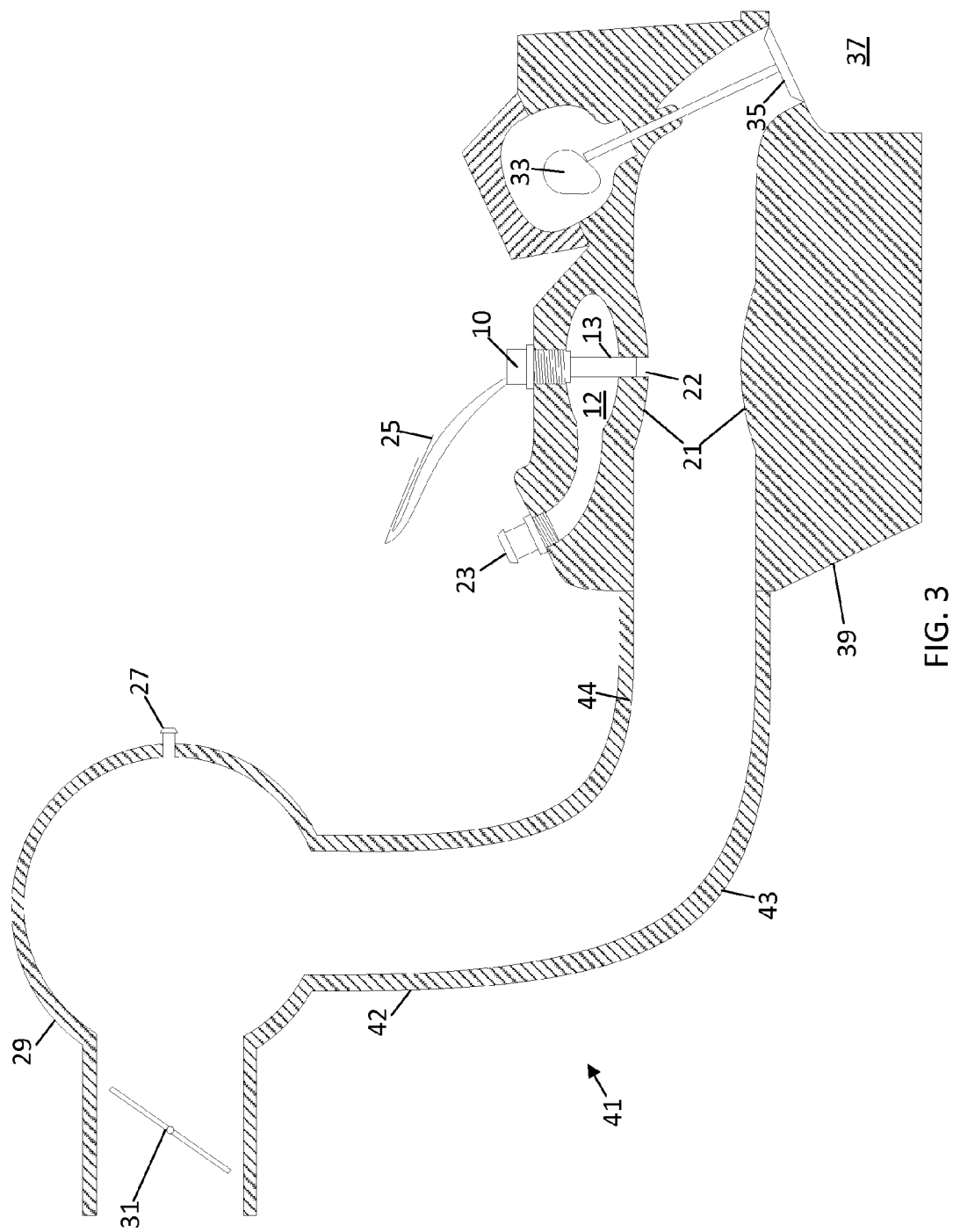
FIG. 3 illustrates another example fuel delivery system.

FIG. 3 illustrates another example fuel delivery system. The fuel delivery system may include an intake manifold 41, a plenum 29, a manifold sensor array 27, a throttle device 31, a fuel inlet 23, a cylinder head 39, a camshaft 33, an intake valve 35, a fuel injector 10, a plunger 13, a fuel inlet 23, and a venturi passage 21. The intake manifold 41 may include a first portion 42, which may be vertical, a second portion 44, which may be horizontal, and a third portion 43, which may be curved and may connect the first portion 42 and the second portion 44. The fuel delivery system is coupled with a combustion chamber 37. The control wiring 25 electrically connects the fuel injector 10 to the engine control unit 20. Additional, different, or fewer components may be provided.

The throttle device 31 regulates the flow of air into the intake manifold 41. The throttle device 31 may be a butterfly valve shaped as a disk. The throttle device 31 may be a throttle valve driven by an accelerator pedal, a throttle lever, or a signal from the engine control unit 20. The throttle device 31 may extend to the walls of the intake manifold 41. That is, the radius of a disk of the throttle device 31 may be slightly smaller than the radius of the intake manifold. Alternatively, the throttle device 31 may be spaced apart from the intake manifold 41 such that some air can always flow around the throttle device 31. The throttle device 31 may be positioned as shown. Alternatively, the throttle device 31 may be positioned within the plenum 29 or farther downstream in the intake manifold 41.

The plenum 29 may be shaped to control the pressure of the air in the intake manifold. The plenum 29 may allow an accurate reading to be detected by a pressure sensor (e.g., barometric sensor). The pressure sensor may include a transducer that produce a pressure signal as a function of pressure imposed on the transducer. The manifold sensor array 27 may include one or more pressure sensors. The manifold sensor array 27 may also include a thermometer or an air flow meter. The manifold sensor array 27 may generate an input signal for the engine control unit 20.

The manifold sensor array 27 may also include a throttle sensor in the position shown in FIG. 3 or in a position adjacent or near the throttle device 31. The throttle sensor may generate an input signal based on a position of the throttle device 31. The engine control unit 20 may generate a drive signal based on an input signal generated by manifold sensor array 27. For example, as more air is allowed into the intake manifold 41, the engine control unit 20 instructs the fuel injector 10 to release more fuel according to the specified air to fuel ratio.

The intake manifold 41 includes the first portion 42, the second portion 44, and the third portion 43. The intake manifold 41 may alternatively be substantially vertical or substantially horizontal without a curved portion. One or more of the sensors in the in the manifold sensor array 27 may be mounted in the first portion 42, the second portion 44, or the third portion 43. In one example, a separate pressure sensor is mounted in each of the first portion 42, the second portion 44, and the third portion 43. Other arrangements of pressure sensors, temperature sensors, throttle sensors, and/or flow meters may be used.

The intake manifold 41 may be coupled with and/or formed integrally with the cylinder head 39 that is adjacent to the cylinder. The intake manifold 41 and/or the cylinder head may form an intake flow component configured to mix a flow of air and a flow of gaseous fuel. The cylinder head 39 also forms the combustion chamber 37. The camshaft 33 rotates to open and close the intake valve 35 to release the air and fuel mixture into the combustion chamber 37. The fuel inlet 23 may receive fuel from a fuel supply path to fill the fuel chamber 12.

The venturi passage 21 may be coupled with an injection port 22. When pressure within the venturi passage 21 drops to a specific level and the plunger 13 is in a position to connect the fuel chamber 12 and the venturi passage 21, fuel is drawn through the injection port 22. The location of the injection port 22 impacts that amount of time for the air and fuel mixture to reach the combustion chamber 37. An example range of distances from the combustion chamber 37 to the injection port 22 may be 2-10 centimeters. Arrangements where the injection port is near the throttle device 31 or upstream of the throttle device 31 may start slower and respond less quickly than arrangements in which the injection port 22 is near the combustion chamber 37. Other variations are possible.

Figure 4:
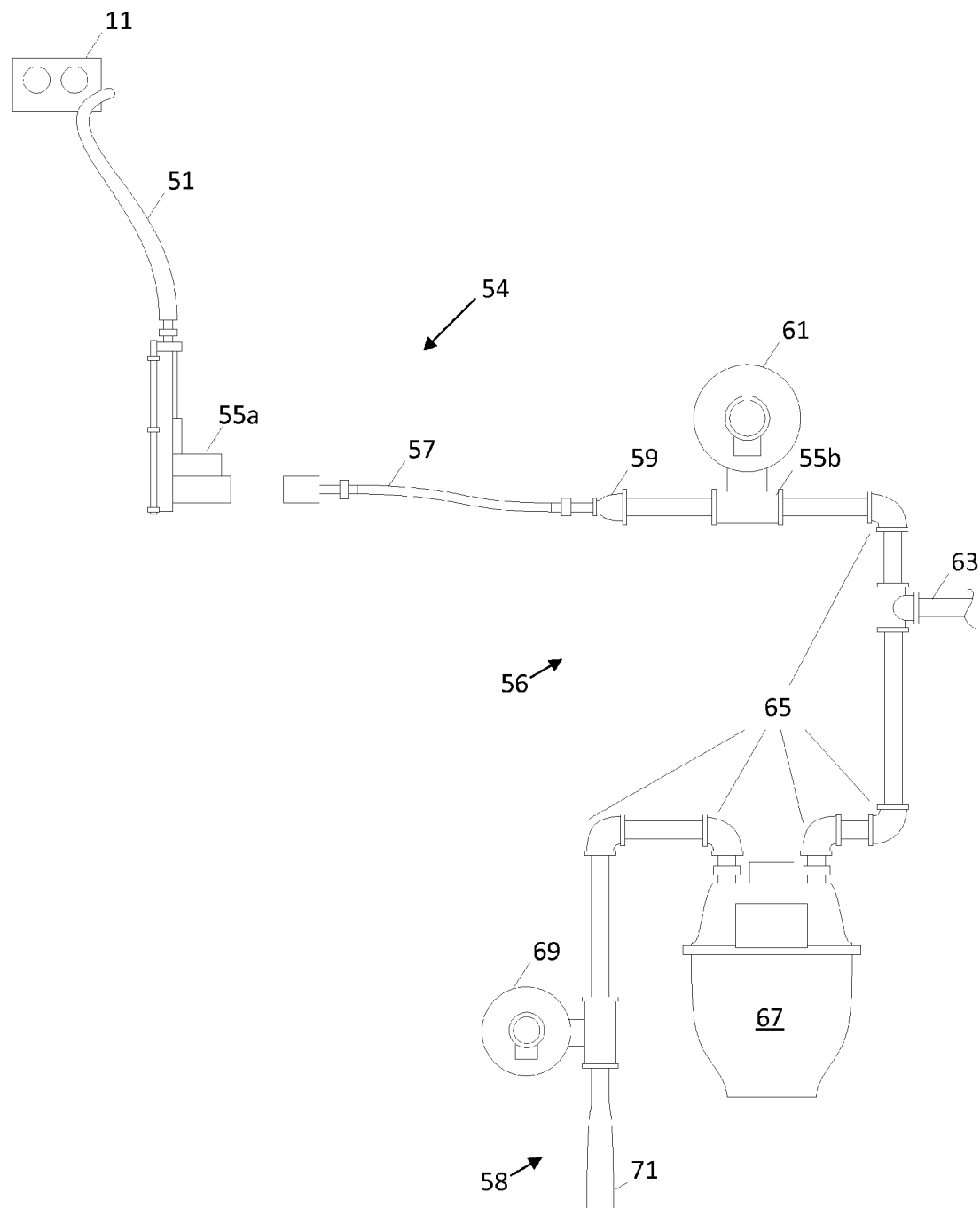
FIG. 4 illustrates an example fuel supply path.

FIG. 4 illustrates an example fuel supply path. The fuel supply path may be coupled to the chassis 11 of the fuel delivery system. The fuel supply path may include an engine fuel supply line 51, a demand regulator 53, a low pressure supply section 54, a medium pressure supply section 56, and a high pressure supply section 58. The low pressure supply section 54 is bounded by a first joint 55a and a second joint 55b and may include a flexible coupling 57, a secondary regulator 61 and a reducer 59. The medium pressure supply section 56 includes one or more elbow connections 65, a meter 67, and a primary regulator 69. The high pressure supply section 58 includes a supply line 71 and upstream portions of the supply path to the utility provider. Another connection 63 may lead to a home or another device that uses the gaseous fuel. Additional, different, or fewer components may be provided. For example, only one regulator may be used.

The primary regulator 60 and the secondary regulator 61 are pressure regulators configured to control the fuel supply and/or decompress the gaseous fuel stored at high pressure. The pressure regulators supply the gaseous fuel to the first chamber at a specific pressure. Any of the pressure regulators may be electronic and receive a control signal from the engine control unit 20. In electronic pressure regulators, the specific pressure may be controlled by a setting made through a control panel or the engine control unit 20. Any of the pressure regulators may be mechanical and include a diaphragm that is pushed against a spring to open and close a valve of a regulating orifice. In mechanical pressure regulators, the specific pressure may be controller by a manual dial, dip switch, or an adjustment handle. Example pressures at the primary regulator 60 and the secondary regulator 61 may include 5 psi, 10 psi, or 100 psi.

Because precise metering may achieved through control of the plunger 13 to selectively connect and disconnect the fuel chamber 12 and the venturi passage 14, less precision of the fuel supply to the fuel chamber 12 may be needed or used. A single mechanical pressure regulator with a range of fuel pressures may supply the fuel to the fuel chamber 12. Other variations are possible.

Figure 5:
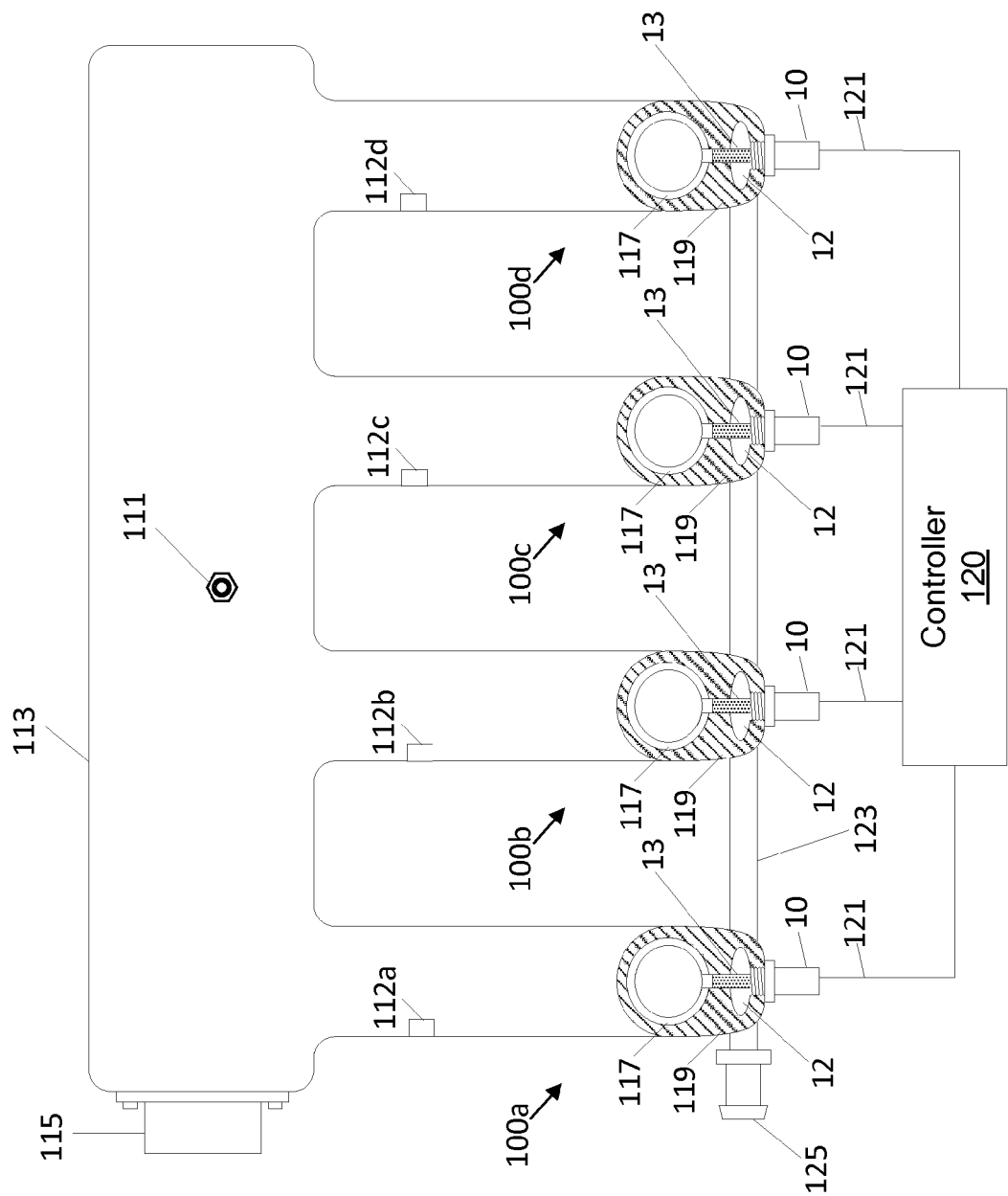
FIG. 5 illustrates an example fuel delivery system for a multi-cylinder engine.

FIG. 5 illustrates an example fuel delivery system for a multi-cylinder engine. The multi-cylinder engine may include multiple cylinders 100a-d. Example numbers of cylinders include 2, 4, 6, and 8, though any number of cylinders may be possible. The multi-cylinder engine may include an intake manifold 113, a throttle plate 115, a fuel supply 125, a fuel rail 123, a manifold sensor 111, cylinder sensors 112a-d and a controller 120. Each cylinder 100a-d may include a fuel injector 10, a plunger 13, a fuel chamber 12, a venturi passage 117, a fuel delivery chassis 119, and a communication line 121. Additional, different, or fewer components may be provided. For example, multiple cylinders may be coupled to the same fuel delivery system. The multiple cylinders may share a controller but each includes a separate fuel injector. Alternatively, the multiple cylinders may share a single fuel chamber and/or a single plunger.

The controller 120 may generate one or more drive signals for the cylinders 100a-d. In one example, a single drive signal is used. In another example, a separate drive signal is used for each of the cylinders 100a-d. The separate drive signals may specify different duty cycles and/or air to fuel ratios. For example, each cylinder may have a different ideal air to fuel ratio based on measured performance or physical characteristics of the cylinder.

In addition or in the alternative, each cylinder may be associated with a cylinder sensor 112a-d. The cylinder sensor 112a-d may be any combination of a pressure sensor, an air to fuel ratio sensor, a temperature sensor or a flow meter. Therefore, the controller 120 may be configured to specifically tailor the drive signal for each cylinder according to the airflow in the portion of the chamber leading to the cylinder, the air to fuel ratio in the airflow in the portion of the chamber leading to the cylinder, and/or the temperature of the chamber leading to the cylinder. The controller 120 may generate a duty cycle for the drive signal for each cylinder according to the sensor data.

Figure 6:
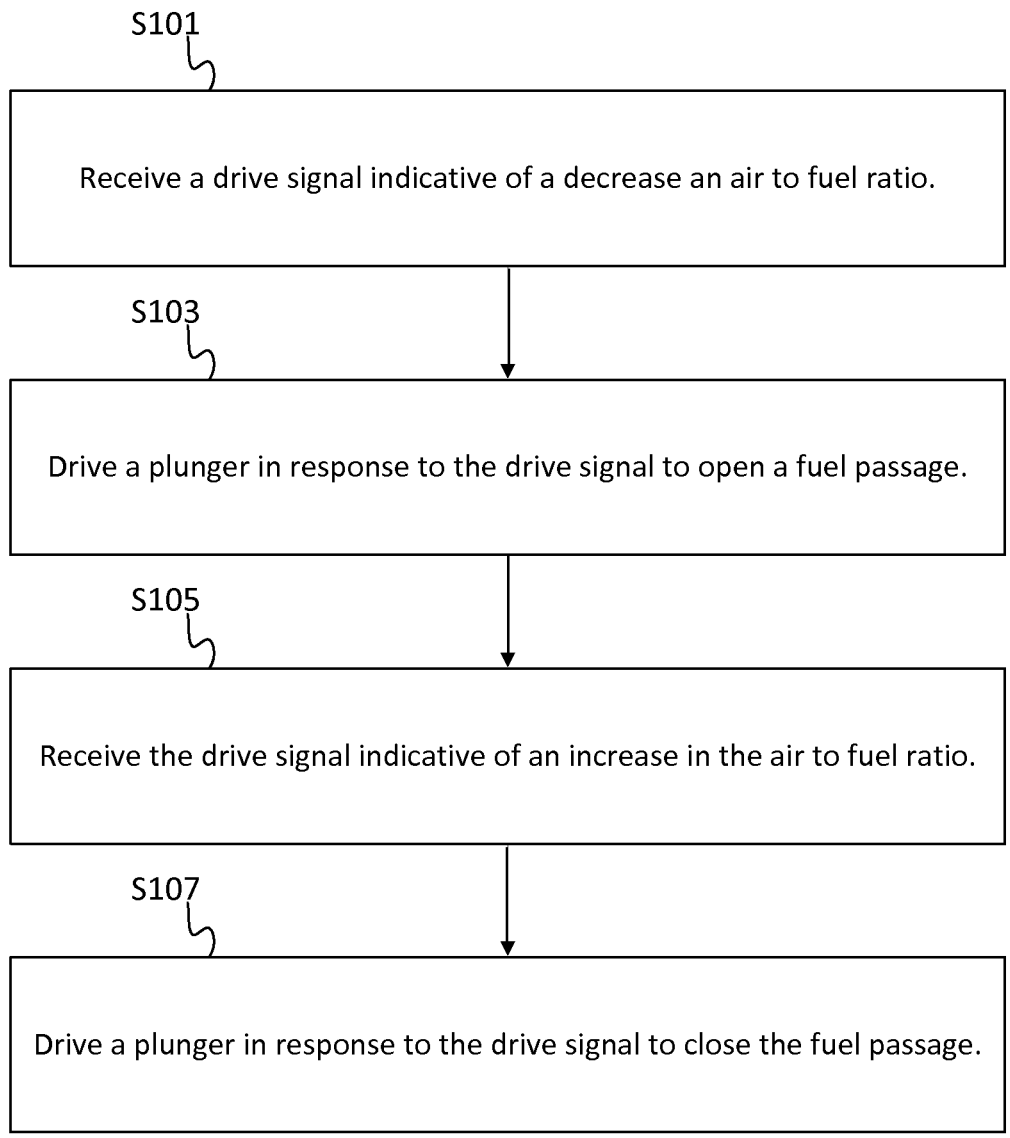
FIG. 6 illustrates an example flowchart for gaseous fuel delivery.

FIG. 6 illustrates an example flow chart for gaseous fuel delivery. Additional, different, or fewer acts may be provided. The acts may be performed in the order shown or other orders. The acts may also be repeated. The acts may be performed by any of the fuel delivery systems described above.

At act S101, a drive signal is received that represents a command to decrease an air to fuel ratio or the mixture in the manifold. The drive signal may be received at a solenoid. That is, the drive signal may be an electrical current for energizing a coil in the solenoid to engage or disengage a plunger. The electrical current may be square wave of a predetermined duty cycle. The drive signal may be received at a controller. That is, the drive signal may include sensor data or a time division signal and the controller may generate another signal for driving the solenoid.

At act S103, the plunger of the solenoid is driven in response to the drive signal. The plunger is engaged or disengaged to open a fuel passage to the intake manifold in order to all more fuel to enter the intake manifold, which decreases the proportion of air and the air to fuel ratio of the mixture.

As the air to fuel ratio approaches the desired ratio, the drive signal is changed. The drive signal may also lower the air to fuel ratio. At act S105, a drive signal indicates a command to increase an air to fuel ratio or the mixture in the manifold. At act S107, the plunger is driven to close the fuel passage in response the command to increase the air to fuel ratio. Other variations are possible.

Figure 7:
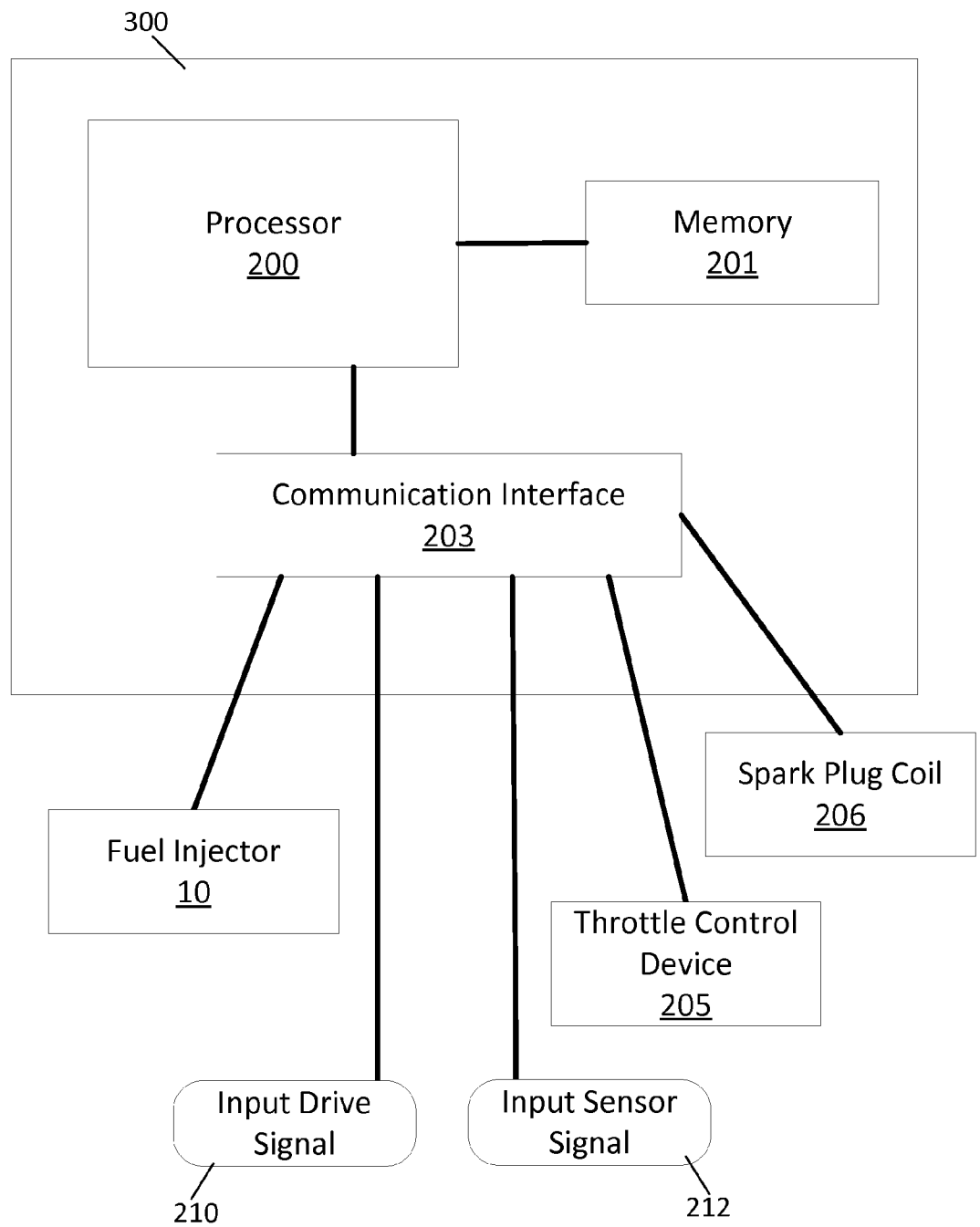
FIG. 7 illustrates an example control system for a gaseous engine.

FIG. 7 illustrates a control system for a gaseous engine. The control system includes a controller 300 having at least a processor 200, a memory 201, and a communication interface 203. Additional, fewer, or different components or arrangements are possible. The communication interface 203 may be electrically connected to a sensor array through an input sensor signal 212. The communication interface 203 may be electrically connected to a user input through an input run signal 210. The communication interface 203 may also be electrically connected to the fuel injector 10 and a throttle control device 205 and/or a spark plug coil 206. The spark plug coil 206 receives a control signal from the controller 300 and generates a high voltage spark across a gap for igniting the gaseous fuel and air mixture in the combustion chamber.

The communication interface 203 may be configured to receive one or more input signals including input data. The input signals may include individual input signals for multiple cylinders at some times and/or a joint or combined input signal at other times. The input signals may include a run signal 210 generated at an ignition (e.g., in response to a key turn or ignition switch) or at another controller (e.g., engine control unit). The input signals may include an input sensor signal 212. The input sensor signal 212 may represent sensor data generated at one or more of a pressure sensor, air flow meter, or a throttle sensor.

In one example, data from the pressure sensor is used to set an air to fuel ratio or duty cycle for defining the input signal. Other sensor data may be used at feedback to refine or finely tune the air to fuel ratio. The other sensor data may include temperature data from a temperature data, flow rate data from a flow meter, and ratio data from an air to fuel ratio sensor.

The controller 300 is configured to generate at least one control signal in response to the input data. The control signal may be configured to cause a gaseous engine (or engine generator) to move a plunger to mix a flow of air and gaseous fuel by selectively connecting a venturi pressure from the flow of air through an intake manifold to a chamber of the gaseous engine.

The control signal may include a variable duty cycle. The duty cycle may be rated as a percentage of a time period for a high signal compared to the total time of the control signal. Example duty cycles include 1%, 5%, 10% or any percent. The percentage of the duty cycle may define an amount of time that plunger opens the fuel passage. The plunger may pulse in synchronization with the control signal. The duty cycle may directly correspond to the measured pressure in the manifold (e.g., as the pressure in the manifold decreases, the duty cycle decreases). The duty cycle may indirectly correspond to the air to fuel ratio (e.g., as the duty cycle is increased, the air to fuel ratio decreases).

The control signal may include individual control signals for multiple cylinders. The individual control signals may be different according to feedback received from the various cylinders, the physical characteristics of the various cylinders, or another reason. The control signal may include separate components for multiple cylinders. The multiple cylinders may be divided in time sequence or through an encoding technique. In one example, the control signal includes a first component for a first cylinder and a second component for a second cylinder, and the first component is different than the second component. Alternatively, all of the cylinders may use the same control signal.

The controller 300 may also be configured to control the throttle of the gaseous engine. The controller 300 may generate commands for the throttle control device 205, which may be another controller or a stepper motor configured to move a throttle plate to control the amount of air that enters the combustion chamber through the intake manifold. The controller 300 may coordinate the commands for the throttle control device 205 with the commands for the fuel injector 10. As more air allowed into the intake manifold by the throttle control device 205, more gaseous fuel is allowed into the intake manifold by the fuel injector. Alternatively, when the venturi passage is located in the cylinder head, as more air allowed into the cylinder head by the throttle control device 205, more gaseous fuel is allowed into the cylinder head by the fuel injector.

Figure 8:
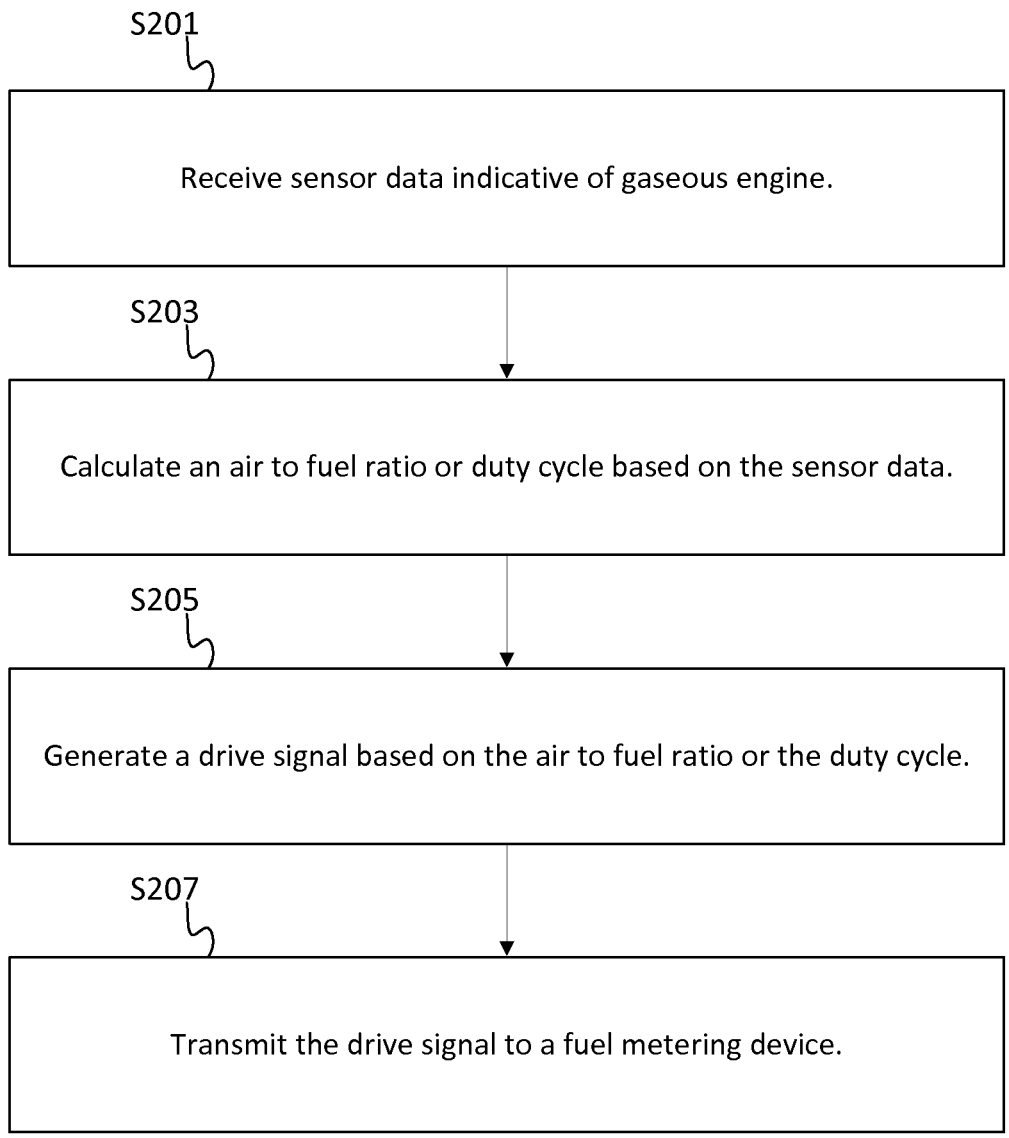
FIG. 8 illustrates an example flowchart for the control system of FIG. 7.

FIG. 8 illustrates an example flowchart for the control system of FIG. 7. Additional, different, or fewer acts may be provided. The acts may be performed in the order shown or other orders. The acts may also be repeated. The acts may be performed by any of the controllers of fuel delivery systems described above.

At act S201, sensor data is received. The sensor data may be received at the controller 300 from various types of sensors described above. The sensor data may describe current operating conditions of a gaseous engine.

At act S203, the controller 300 calculates an air to fuel ratio or a duty cycle based on the sensor data. The memory 201 may include a lookup table that associated sensor data values to corresponding air to fuel ratios or duty cycles. Alternatively, the lookup table may associate sensor data values to levels for the distance h that describes a position of the plunger 13.

The controller 300 is configured to query the lookup table using sensor data to receive a duty cycle for controlling the flow of gaseous fuel. At act S205, the controller 300 is configured to generate a drive signal based on the duty cycle or based on the air to fuel ratio. At act S207, the controller 300 is configured to transmit the drive signal to a fuel metering device including a plunger or a rod.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the controller 300 such as a secure digital (SD) memory card.

The communication interface 203 may include any operable connection. An operable connection may be one in which signals, physical communications, and/or logical communications may be sent and/or received. An operable connection may include a physical interface, an electrical interface, and/or a data interface. The communication interface 203 provides for wireless and/or wired communications in any now known or later developed format.

The controller 300 may be connected to a network. The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memory 201 may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A fuel injection system for a gaseous engine, the fuel injection system comprising:
    an intake flow component configured to mix a flow of air and a flow of gaseous fuel, wherein a venturi surface is configured to cause a venturi pressure from the flow of air;
    a throttle configured to regulate the flow of air into the intake flow component;
    a plunger configured to regulate the flow of gaseous fuel into the intake flow component under the venturi pressure; and
    a controller configured to generate at least one drive signal for the plunger,
    wherein the at least one drive signal includes a plurality of drive signals, and each of the plurality of drive signals is associated with a cylinder of the gaseous engine.

2. The fuel injection system of claim 1, wherein the venturi surface is downstream of the throttle with respect to the flow of air.

3. The fuel injection system of claim 1, comprising:
    a gaseous fuel chamber in physical connection with the plunger.

4. The fuel injection system of claim 3, comprising:
    a pressure regulator configured to supply gaseous fuel to the gaseous fuel chamber.

5. The fuel injection system of claim 1, wherein a first drive signal provides a different fuel ratio than a second drive signal.

6. The fuel injection system of claim 1, wherein the at least one drive signal is based on an input signal generated by a manifold pressure sensor or a throttle sensor.

7. The engine fuel injection system of claim 1, wherein the intake flow component is formed integrally with a cylinder head.

8. The fuel injection system of claim 1, wherein the intake flow component is an intake manifold.

9. A method comprising:
    regulating, at a throttle, a flow of air into an intake flow component;
    mixing, at the intake flow component, the flow of air and a flow of gaseous fuel, wherein a venturi surface is configured to cause a venturi pressure from the flow of air;
    regulating, by a plunger, the flow of gaseous fuel into the intake flow component under the venturi pressure, and
    generating at least one drive signal for the plunger,
    wherein the at least one drive signal includes a plurality of drive signals.

10. The method of claim 9, wherein the venturi surface is downstream of the throttle with respect to the flow of air.

11. The method of claim 9, further comprising:
    supplying the flow of gaseous fuel from a gaseous fuel chamber.

12. The method of claim 9, further comprising:
    supplying, with a pressure regulator, gaseous fuel to the gaseous fuel chamber.

13. The method of claim 9, wherein each of the plurality of drive signals is associated with a cylinder of the gaseous engine.

14. The method of claim 9, wherein the at least one drive signal includes a first drive signal and a second drive signal, wherein the first drive signal provides a different fuel ratio than the second drive signal.

15. The method of claim 9, wherein the at least one drive signal is based on an input signal generated by a manifold pressure sensor or a throttle sensor.

16. A fuel injection system for a gaseous engine, the fuel injection system comprising:
    an intake flow component configured to mix a flow of air and a flow of gaseous fuel, wherein a venturi surface is configured to cause a venturi pressure from the flow of air;
    a throttle configured to regulate the flow of air into the intake flow component;
    a plunger configured to regulate the flow of gaseous fuel into the intake flow component under the venturi pressure; and
    a controller configured to generate at least one drive signal for the plunger, wherein the at least one drive signal is based on an input signal generated by a manifold pressure sensor or a throttle sensor.

17. The fuel injection system of claim 16, wherein the venturi surface is downstream of the throttle with respect to the flow of air.

18. The fuel injection system of claim 16, comprising:
    a gaseous fuel chamber in physical connection with the plunger.

19. The fuel injection system of claim 16, comprising:
    a pressure regulator configured to supply gaseous fuel to the gaseous fuel chamber.

20. The fuel injection system of claim 16, wherein the at least one drive signal includes a plurality of drive signals associated with one or more cylinders of the gaseous engine.

* * * * *